3,475,462
CONJUGATED ACETYLENIC KETONES
Roland Chretien, Paris, and Georges Wetroff, Le Thillay, France, assignors to Produits Chimiques Pechiney-Saint-Gobain, Neuilly-sur-Seine, France
No Drawing. Filed Mar. 16, 1966, Ser. No. 534,664
Claims priority, application France, Mar. 18, 1965, 9,754
Int. Cl. C07d 5/16, 49/20; A01n 9/24
U.S. Cl. 260—347.8
4 Claims

ABSTRACT OF THE DISCLOSURE

A conjugated acetylenic ketone having the formula

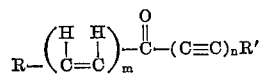

in which R is a group selected from the group consisting of alkyl, aromatic and heterocyclic nucleus, R′ represents an alkyl group $m$ and $n$ are whole numbers in which $m$ is within the range of 1 to 4 and $n$ is within the range of 2 to 4.

---

This invention relates to a new class of chemical compounds identified as conjugated acetylenic ketones having at least one ethylenic bond and at least two acetylenic bonds. It relates further to the method for the manufacture of said compounds and the use of same as a parasiticide.

Phenyl-1 hexadiyne-2,4 one-1 is recognized as having anti-fungal activity; however, the compound has very little activity against parasitic fungus, such as *Trichophyton interdigitale* and the standardized mixture NF×41–514 unless used in excessively large amounts.

The ketonic compounds of this invention show remarkable effectiveness in inhibiting several parasitic organisms even when used in relatively low concentrations.

The conjugated acetylenic ketones of this invention, containing at least one ethylenic bond and at least two acetylenic bonds can be represented by the formula:

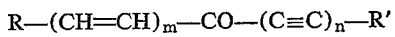

in which R represents a lower alkyl group such as methyl, ethyl, propyl, butyl, pentyl, isobutyl and the like; an aralkyl group such as benzyl aralkyl such as, tolyl, xylyl and the like; a cycloalkyl group, or at least an aromatic or heterocyclic nucleus or residue which may be unsubstituted or substituted by one or more groups represented by an alkyl group such as methyl, ethyl, propyl, butyl, pentyl, isopentyl and the like; an acyl group such as acetyl, propionyl, isobutyryl and the like; a halogeno group such as chloro, bromo, iodo and the like; a trihalogeno methyl group; a hydroxyl group; an alkoxyl group such as methoxyl, ethoxyl, butoxyl and the like; a dialkylamino group such as dimethylamino, diethylamino, methylethylamino and the like; or a dialkylamido group such as dimethylamido, diethylamido, dipropylamido, methylethylamido and the like; $m$ and $n$ are whole numbers limited in practice by the stability of the particular acetylenic ketone in which $m$ is preferably a number within the range of from 1 to 4 and $n$ is preferably a value within the range of 2 to 4. R′ represents a hydrogen atom, a halogen atom such as chlorine, bromine, iodine and the like; a lower alkyl group such as methyl, ethyl, propyl, butyl, pentyl and the like; an aralkyl group such as benzyl, tolyl, xylyl and the like; a cycloalkyl group, an acyl group such as acetyl, propionyl, isobutyryl and the like, an aryl group such as phenyl and the like, or at least an aromatic or heterocyclic nucleus or residue which may be unsubstituted or substituted with the same substituent as the R group as previously defined.

It has been found that the compound characterized by the ketone function associated with at least one ethylenic bond and at least two acetylenic bonds exhibits a marked parasitic activity of very high efficiency.

The ketonic compounds may be prepared by the oxidation of the corresponding alcohol, as by means of a conventional oxidizing agent such as chromic anhydride or active manganese dioxide. The corresponding alcohols can be obtained by various methods such as (a) by the action of the ethylenic aldehydes on lithium or sodium derivatives of true acetylenics in liquid ammonia or in any other suitable solvent, (b) by the action of the ethylenic aldehydes on magnesium derivatives of the true acetylenics, or (c) by action of 1-bromo acetylenics on the true acetylenics in accordance with the reaction of Cadiot and Chodkiewicz.

The ketonic compounds and particularly phenyl-1, octene-1 diyne-4,6 one-3; (furyl-2)-1 octene-1 diyne-4,6 one-3; and nonene-2 diyne-5,7 one-4 actively inhibit bacteria growth and/or are capable of destroying bacteria, particularly *Corynebacterium diphtheriae*, *Staphylococcus aureus*, *Streptococcus pyrogenes*, *Bacillus megaterium* KM, *Escherichia coli* W1364 and *Streptomyces* S5.

The compounds of this invention have been found also to exhibit an anti-fungal activity such as towards *Sabouraudites gypseum*, *Trichophyton glyseum granulosum*, *Trichophyton interdigitale*, *Plasmopara viticola*, and standardized mixture NF×41–514.

The ketonic compounds of this invention can be employed alone or mixed advantageously with known microbicides. The compounds can be formulated with suitable carriers such as a solvent, as represented by acetone, benzene, chlorobenzene, chloroform, or mixed with an inert carrier such as talcum, silica, koalin and the like for application in a powdered state. The ketone compounds can also be formulated into a paste or pomade for application.

The following examples are given by way of illustration, but not by way of limitation, of the practice of this invention:

Example 1.—Preparation of phenyl-1- octene-1 diyne-4,6 one-3

A solution of 17.3 g. of 1,3-pentadiyne in 25 ml. of anhydrous ether is added dropwise at room temperature to 150 ml. of anhydrous ether containing magnesium-ethyl bromide formed of 7.45 g. of magnesium and 36.8 g. of ethyl bromide and the combination is refluxed until ethane is no longer given off.

The solution of the magnesium deravtive of 1,3-pentadiyne, which is obtained, is cooled in a salt-ice freezing bath and 35 g. of cinnamic aldehyde are added slowly with agitation. After one hour of agitation the temperature is raised to room temperature and left to stand over night. The product is hydrolyzed with the help of an icy solution of ammonium chloride and then extracted with ether. The ether solution is washed with water, dried on sodium sulfate and then the ether is removed by distillation. After re-crystallization in petroleum ether, 38 g. of phenyl-1 octene-1 diyne-4,6 ol-3, having a melting point of 81° C., are obtained, corresponding to a yield of 72% by weight of theory. 10 g. of the alcohol are dissolved in 75 ml. of acetone and introduced into a suspension of 100 g. of active $MnO_2$ in 900 ml. of petroleum ether. After agitating for 9 hours at room temperature, the product is filtered and the solvent is removed by distillation. After re-crystallization in petroleum ether, 6.4 g. of phenyl-1 octene-1 diyne-4,6 one-3 are obtained, having a melting point of 79° C., corresponding to a yield of 64% by weight of theory.

Example 2

The bactericide activity of the phenyl-1 octene-1 diyne-4,6 one-3 is illustrated as follows:

A solution is prepared of 10 mg. of the compound per ml. of acetone. The solution is added to containers containing gelose medium based upon heart and brain extracts (Infusion "Brain Heart" of Difco) in amounts to provide mixtures containing 100, 50, 25, 12.5 and 6.25 µg. of the compound per ml. of medium.

The containers are implanted with several microorganisms. After 24 hours and 48 hours of incubation at 37° C., examination was made to determine the minimum concentration of the compound required to inhibit the development of the implanted bacteria. Controls were used containing cultures on normal gelose in which only acetone was introduced. The following are the results that were obtained:

| Bacteria | Minimal concentrations of phenyl-1 octene-1 diyne-4,6 one-3 µg./ml. | |
|---|---|---|
| | After 24 h. | After 48 h. |
| Corynebacterium diphtheriae | 25 | 50 |
| Staphylococcus aureus | 25 | >100 |
| Streptococcus pyogenes | 25 | 50 |
| Bacillus megaterium KM | 25 | 25 |

Example 3

The anti-fungal activity of the compound of Example 1 has also been determined on the standardized mixture of NF×41–514 as follows:

The culture medium is formulated of an aqueous solution containing 40 g./l. of malt extract and 0.5 g./l. of mycologic peptone and the culture was divided into several test tubes of 10 ml. capacity. The tubes were sterilized in an autoclave at 120° C. for 15 minutes. A suspension of 1% phenyl-1 octene-1 diyne-4,6 one-3 was introduced into each tube in an amount ranging from one part per 1,000 to one part per 100,000 by weight based upon the culture medium. The tubes were each implanted with approximately equal quantities of mycelium taken from stock culture. They were then placed in a dry oven at 28–30° C. The tubes were examined after 10 days of incubation at this temperature. For comparison, use was also made of a test tube containing only the culture medium. As a further comparison for illustration of the improvement in anti-fungal activity of the component of Example 1, identical tests were conducted with the compound phenyl-1 hexadiyne-2,4 one-1.

The minimum concentration of the phenyl-1 octene-1 diyne-4,6 one-3 completely to inhibit the growth of the standardized mixture NF×41–514 after 10 days of incubation at 28–30° C. is one part per 25,000, as compared to one part per 6,600 for phenyl-1 hexadiyne-2,4 one-1. This indicates that phenyl-1 octene-1 diyne-4,6 one-3 is four times more effective then phenyl-1 hexadiyne-2,4 one-1 against a standardized mixture NF×41–514.

Example 4.—Preparation of (furyl-2)-1 octene-1 diyne-4,6 one-3

The preparation is the same as that described in Example 1. An ether solution of the magnesium derivative of 1,3-pentadiyne is obtained by reaction of 5.5 g. of magnesium, 27.5 g. of ethyl bromide, and 12.8 g. of 1,3-pentadiyne in 200 ml. of anhydrous ether.

To the solution there is added 24 g. of furylacroleine and after re-crystallization in a mixture of benzene and petroleum ether, 27.2 g. of (furyl-2)-1 octene-1 diyne-4,6 ol-3 having a melting point of 56° C. were obtained, corresponding to a yield of 73% by weight of theory.

The 27.2 g. of the alcohol were oxidized in the presence of a suspension of 272 g. of active $MnO_2$ in 2.7 l. of acetone which had previously been distilled over $MnO_4K$. After re-crystallization in a mixture of benzene and petroleum ether, 17.9 g. of (furyl-2)-1 octene-1 diyne-4,6 one-3, having a melting point of 104° C., were obtained, corresponding to a yield of 56.5% by weight of theory.

Example 5

The bactericidal activity of the product of Example 4 is illustrated in the procedure described in Example 2.

The minimum concentrations of this compound which is effective completely to inhibit the development of the implanted bacteria, after 24 hours of incubation at 37° C., are summarized in the following table:

| Bacteria: | Minimum concentrations of (furyl-2)-1 octene-1 diyne-4,6 one-3, µg./ml. |
|---|---|
| Staphylococcus aureus | 100 |
| Escherichia coli W1364 | 100 |
| Streptomyces S5 | 100 |
| Corynebacterium diphtheriae | 50 |
| Streptococcus pyogenes | 50 |
| Bacillus megaterium KM | 50 |

Example 6

The anti-fungal activity of the product of Example 4 on *Trichophyton interdigitale* is illustrated as follows:

A culture medium is formulated of 100 ml. of Sabouraud medium gelosed at 2% and sterilized in an autoclave at 110–120° C. for 20 minutes. At the outlet of the autoclave, addition is made to each medium of .5 ml. of acetone containing the compound in proportions ranging from one part per 1,000 to one part per 100,000 based upon the culture medium. The different culture media were mixed and poured into Petri dishes which had previously been sterilized. A control was provided which contains the Sabouraud medium having .5 ml. of acetone per 100 ml. of the medium.

After cooling, the dishes were implanted with approximately equal quantities of mycelium taken from stock cultures. They were then placed in a dry oven at 28° C. Examination of the Petri dishes was made after 10 days of incubation at this temperature. For purposes of comparison, identical tests were carried out with phenyl-1 hexadiyne-2,4 one-1.

The minimum concentration of (furyl-2)-1 octene-1 diyne-4,6 one-3 completely to inhibit the growth of *Trichophyton interdigitale* is one part per 40,000 as compared to one part per 20,000 for phenyl-1 hexadiyne-2,4 one-1. This indicates that the activity of the compound of Example 4 is twice as great as that of phenyl-1 hexadiyne-2,4 one-1, towards *Trichophyton interdigitale*.

Example 7.—Preparation of nonene-2 diyne-5,7 one-4

The procedure is the same as in Example 4 except that 14 g. of crotonaldehyde was substituted for the furylacroleine.

16.3 g. of nonene-2 diyne-5,7 ol-4 were obtained, corresponding to a yield of 61% by weight of theory. The alcohol is oxidized with 160 g. of active $MnO_2$ in suspension in 1.6 l. of acetone.

After the solvent is vacuum distilled, 5.45 g. of nonene-2 diyne-5,7 one-4 are obtained, corresponding to a yield of 34.5% by weight of theory.

Example 8

The anti-fungal activity of the product of Example 7 was determined on *Trichophyton interdigitale* as in the procedure described in Example 6.

The minimum concentration of nonene-2 diyne-5,7 one-4 completely to inhibit the growth of *Trichophyton interdigitale* is one part in 40,000 as compared to one part in 20,000 for phenyl-1 hexadiyne-2,4 one-1. This indicates an activity which is twice as great against the *Trichophyton interdigitale*.

It will be understood that invention resides not only in the new and improved chemical compositions but in the method for the manufacture of same and in the use of the same as a parasiticide.

It will be understood that changes may be made in the details of formulation and reaction without departing from the spirit of the invention, especially as defined in the following claims.

We claim:

1. A conjugated acetylenic ketone having the formula

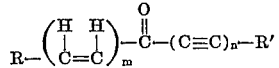

in which R is a member of the group consisting of lower alkyl, phenyl, benzyl, tolyl, xylyl and furyl and R' is a group selected from the group consisting of a lower alkyl, phenyl, benzyl, tolyl and xylyl, $m$ and $n$ are whole numbers in which $m$ is within the range of 1 to 4 and $n$ is within the range of 2 to 4.

2. A conjugated acetylenic ketone as claimed in claim 1 in which the compound is phenyl-1 octene-1 diyne-4,6 one-3.

3. A conjugated acetylenic ketone as claimed in claim 1 in which the compound is (furyl-2)-1 octene-1 diyne-4,6 one-3.

4. A conjugated acetylenic ketone as claimed in claim 1 in which the compound is nonene-2 diyne-5,7 one-4.

OTHER REFERENCES

Tanaka et al., antibiotics and chemotherapy, 9, 151–155 (1959).

Iwai et al., chemical abstracts, 52, 17200e (1958).

DANIEL D. HORWITZ, Primary Examiner

U.S. Cl. X.R.

260—590, 593, 240; 424—285, 331